United States Patent
Deng et al.

(10) Patent No.: US 11,086,136 B2
(45) Date of Patent: Aug. 10, 2021

(54) IMAGE DISPLAY SYSTEM AND MULTIMEDIA PLAYBACK METHOD

(71) Applicant: HTC Corporation, Taoyuan (TW)

(72) Inventors: Qing-Long Deng, Taoyuan (TW); Yu-Sheng Lee, Taoyuan (TW); Yen-Chieh Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 121 days.

(21) Appl. No.: 16/551,730

(22) Filed: Aug. 27, 2019

(65) Prior Publication Data

US 2020/0064649 A1    Feb. 27, 2020

Related U.S. Application Data

(60) Provisional application No. 62/723,458, filed on Aug. 27, 2018.

(51) Int. Cl.
| | | |
|---|---|---|
| *G03B 21/14* | (2006.01) | |
| *G02B 27/48* | (2006.01) | |
| *H04N 5/60* | (2006.01) | |
| *H04N 9/31* | (2006.01) | |
| *H04R 1/02* | (2006.01) | |
| *H04R 3/00* | (2006.01) | |

(52) U.S. Cl.
CPC ............. *G02B 27/48* (2013.01); *G03B 21/14* (2013.01); *H04N 5/60* (2013.01); *H04N 9/3161* (2013.01); *H04R 1/028* (2013.01); *H04R 3/00* (2013.01); *H04R 2499/15* (2013.01)

(58) Field of Classification Search
CPC .... G03B 21/14; G03B 21/005; G03B 21/006; G03B 21/008; G02B 27/48; H04N 9/31; H04N 9/3161; H04N 9/3102
See application file for complete search history.

(56) References Cited

U.S. PATENT DOCUMENTS

| | | | |
|---|---|---|---|
| 9,086,578 B2 * | 7/2015 | Curtis | ................... G03B 21/56 |
| 9,778,478 B1 * | 10/2017 | Adema | ............. G03B 21/2033 |
| 2007/0035826 A1 | 2/2007 | Yokoyama et al. | |
| 2007/0211001 A1 * | 9/2007 | Duncan | .................. G09G 3/346 345/84 |
| 2008/0212040 A1 * | 9/2008 | Aksyuk | .................... G03H 1/02 353/99 |
| 2010/0118535 A1 * | 5/2010 | Kusukame | ......... G03B 21/2033 362/259 |
| 2012/0133894 A1 | 5/2012 | Tanaka et al. | |

(Continued)

FOREIGN PATENT DOCUMENTS

| | | |
|---|---|---|
| CN | 104142602 A | 11/2014 |
| CN | 106331549 A | 1/2017 |

(Continued)

OTHER PUBLICATIONS

Corresponding European search report dated Feb. 7, 2020.
Corresponding Chinese office action dated Mar. 25, 2021.

*Primary Examiner* — William C. Dowling
(74) *Attorney, Agent, or Firm* — CKC & Partners Co., LLC

(57) ABSTRACT

An image display system includes a projector, an image display element, and at least one actuator. The projector is configured to project laser light. The image display element is configured to display an image using the projected laser light. The at least one actuator is configured to vibrate the image display element.

16 Claims, 3 Drawing Sheets

(56) References Cited

U.S. PATENT DOCUMENTS

| | | | |
|---|---|---|---|
| 2012/0206782 A1* | 8/2012 | Chan | G02B 5/0284 359/199.2 |
| 2013/0328770 A1 | 12/2013 | Parham | |
| 2016/0054577 A1* | 2/2016 | Kilcher | G02B 26/105 359/213.1 |

FOREIGN PATENT DOCUMENTS

| | | |
|---|---|---|
| CN | 107894685 A | 4/2018 |
| JP | 2010060745 A | 3/2010 |

* cited by examiner

IMAGE DISPLAY SYSTEM AND MULTIMEDIA PLAYBACK METHOD

CROSS-REFERENCE TO RELATED APPLICATION

This application claims priority to U.S. Provisional Application Ser. No. 62/723,458, filed on Aug. 27, 2018, which is herein incorporated by reference.

BACKGROUND

Technical Field

The present disclosure relates to an image display system and a multimedia playback method, and more particularly, to an image display system and a multimedia playback method using laser light.

Description of Related Art

In recent years, laser light sources have gathered attention as one type of light source for projection-type image display apparatus. A laser light source has several advantages. Firstly, laser light emitted from a laser light source features superior directivity and therefore features high optical utility efficiency. In addition, laser light is monochromatic and therefore can broaden the color reproduction region. A laser light source also features low power consumption and long life compared to other light sources such as incandescent bulbs.

However, when coherent light such as laser light is irradiated onto a rough surface (e.g., a transmission-type screen or a reflection-type screen) having an unevenness that is greater than the wavelength of the laser light, a mottled light pattern referred to as a "speckle pattern" or simply "speckle" is produced. More specifically, light of a single wavelength that is scattered at each point on a rough surface overlaps irregularly at each point on the observed surface to produce a complicated interference pattern.

Thus, when an image is projected onto a screen by a projector that uses a laser light source, the laser light is diffused on the screen surface and strong random noise (speckled noise) is produced. When this speckle pattern is viewed by an observer, the speckle is perceived as unfocused mottled flickering, and this causes discomfort and fatigue for the observer. The observer further senses extreme degradation of the image quality.

Accordingly, it is an important issue for the industry to provide an image display system and a multimedia playback method capable of solving the aforementioned problems.

SUMMARY

An aspect of the disclosure is to provide an image display system and a multimedia playback method that can efficiently solve the aforementioned problems.

According to an embodiment of the disclosure, an image display system includes a projector, an image display element, and at least one actuator. The projector is configured to project laser light. The image display element is configured to display an image using the projected laser light. The at least one actuator is configured to vibrate the image display element.

In an embodiment of the disclosure, the image display element is made of a material including at least one of glass, plastic, and metal.

In an embodiment of the disclosure, the least one actuator includes a piezo actuator, a linear resonant actuator, or a vibration speaker.

In an embodiment of the disclosure, a number of the at least one actuator is plural, and the actuators are separately disposed on the image display element.

In an embodiment of the disclosure, the image display element has a plurality of corners, and the actuators are respectively adjacent to the corners.

In an embodiment of the disclosure, the image display element has a substantially uniform thickness.

In an embodiment of the disclosure, the image display system further includes an audio generation module configured to generate a vibration signal. The at least one actuator is configured to vibrate using the vibration signal.

In an embodiment of the disclosure, the audio generation module is further configured to adjust a vibration frequency of the vibration signal between an audible frequency and an ultrasonic frequency.

In an embodiment of the disclosure, the image display system further includes a controller. The controller is configured to drive the audio generation module to generate the vibration signal when the projector projects the laser light.

In an embodiment of the disclosure, the image display system further includes a controller. The controller is configured to drive the audio generation module to generate the vibration signal having an audible frequency from an audio signal when the projector projects the laser light.

In an embodiment of the disclosure, the image display system further includes a controller. The controller is configured to drive the audio generation module to generate the vibration signal having an ultrasonic frequency when the projector projects the laser light and no audio signal is received by the audio generation module.

In an embodiment of the disclosure, the image display system further includes a controller. The controller is configured to drive the audio generation module to generate the vibration signal having an audible frequency from an audio signal when the projector projects the laser light and a decibel value included in the audio signal is not smaller than a threshold value; and drive the audio generation module to generate the vibration signal having an ultrasonic frequency when the projector projects the laser light and the decibel value included in the audio signal is smaller than the threshold value.

In an embodiment of the disclosure, the image display system further includes a controller. The controller is configured to drive the audio generation module to generate the vibration signal having an audible frequency from an audio signal when the projector does not project the laser light and the audio generation module receives the audio signal.

According to an embodiment of the disclosure, a multimedia playback method includes: projecting laser light to display an image on an image display element; and vibrating the image display element using a vibration signal when the image display element displays the image.

In an embodiment of the disclosure, vibrating the image display element includes vibrating the image display element using the vibration signal having an audible frequency if the vibration signal is generated from an audio signal.

In an embodiment of the disclosure, vibrating the image display element includes vibrating the image display element using the vibration signal having an ultrasonic frequency if the vibration signal is not generated from an audio signal.

In an embodiment of the disclosure, the vibration signal is generated from an audio signal, and vibrating the image display element includes: vibrating the image display element using the vibration signal having an audible frequency if a decibel value included in the audio signal is not smaller than a threshold value; and vibrating the image display element using the vibration signal having an ultrasonic frequency if the decibel value included in the audio signal is smaller than the threshold value.

In an embodiment of the disclosure, the multimedia playback method further includes: stopping projecting the laser light; and vibrating the image display element using another vibration signal having an audible frequency after stopping projecting the laser light if said another vibration signal is generated from an audio signal.

Accordingly, the present disclosure provides an image display system and a multimedia playback method that can solve the problem of speckle caused by laser light and effectively produce sound at the same time. In the image display system, at least one actuator is attached to a surface of an image display element (e.g., a transmission-type screen or a reflection-type screen). The surface of the image display element is vibrated using a vibration signal, so that the wavefront of light originally transmitted from the surface is constantly changing. Once the wavefront of light changes, the phase frequency also changes. At this time, it is difficult for the laser light to form constructive/destructive interference patterns, and thus the speckle cannot be formed. In addition, when the vibration signal is generated from an audio signal, audible sound can also be produced through the surface of the image display element by vibrating the image display element using the vibration signal having an audible frequency. Furthermore, when the vibration signal does not generated from an audio signal, the image display element can be vibrated using the vibration signal having an ultrasonic frequency and still does not form speckle pattern in the projected image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
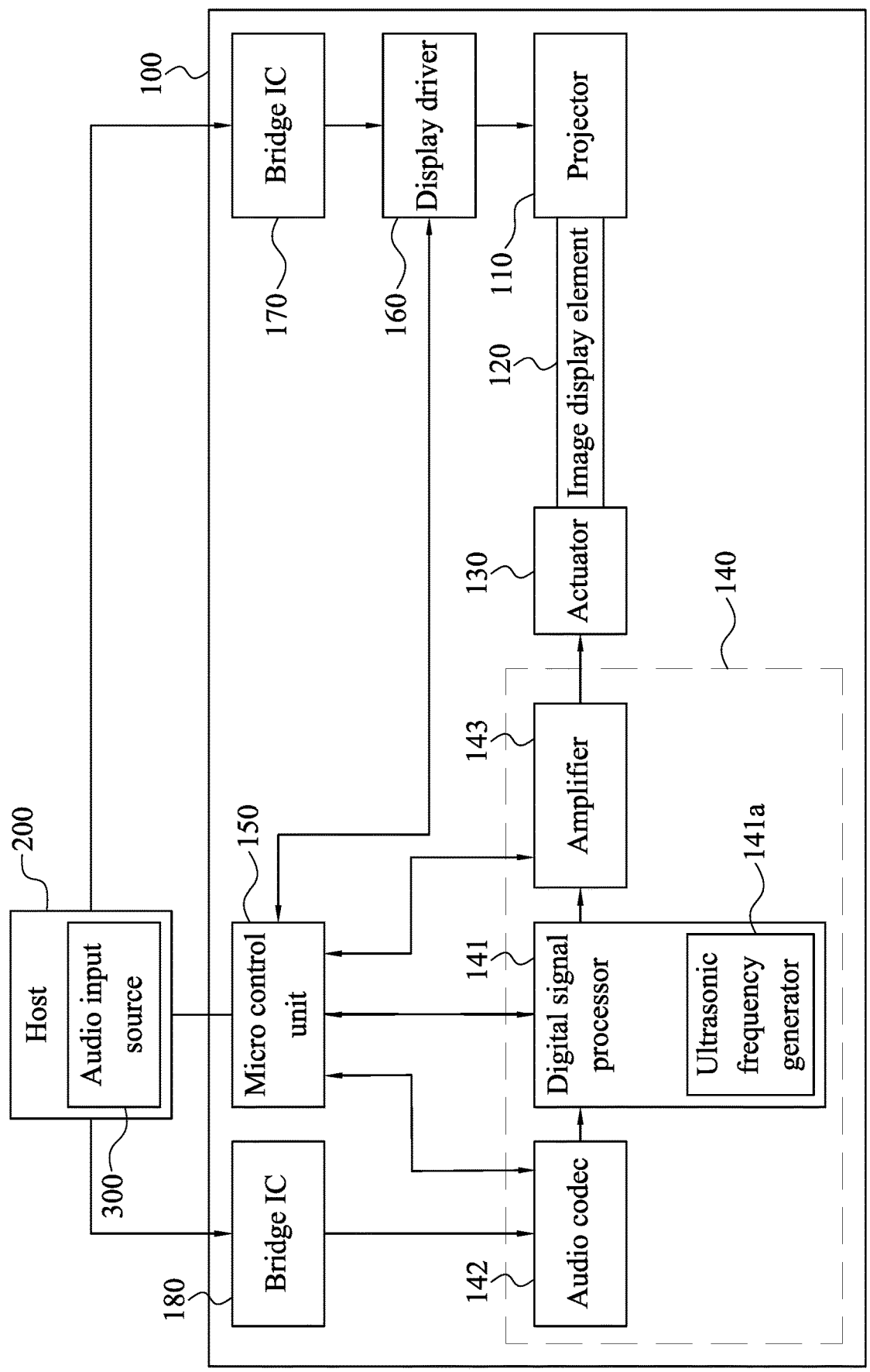
FIG. 1 is a schematic diagram of an image display system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of an image display system 100 according to some embodiments of the present disclosure. As shown in FIG. 1, the image display system 100 includes a projector 110, an image display element 120, and at least one actuator 130. The projector 110 is configured to project laser light. The image display element 120 is configured to display an image using the projected laser light (i.e., created from the projected laser light). The at least one actuator 130 is configured to vibrate the image display element 120.

In some embodiments, the image display element 120 is a transmission-type screen and may be made of a material including glass, plastic (transparent), or the like. For example, the image display element 120 may be a transmission-type screen of a laser-based augmented reality device which is often used as a vehicle head-up display or of laser-based projection augmented reality glasses. In some embodiments, the image display element 120 is a reflection-type screen and is made of a material including plastic (non-transparent), metal, or the like. For example, the image display element 120 may be a reflection-type projection screen which stands in front of the projector 110 (e.g., hanging on a wall or a ceiling). In some embodiments, the image display element 120 may be stiff enough to produce sound (e.g., audible sound) when it is vibrated.

In some embodiments, the at least one actuator 130 may be one of a piezo actuator, a linear resonant actuator, and a vibration speaker, but the disclosure is not limited in this regard.

In some embodiments, the projector 110 may include a laser light source and a plurality of optical elements optically coupled between the laser light source and the image display element 120. In some embodiments, the optical elements may include at least one of a polarization beam splitter, a collimator lens, a light tunnel, a mirror, a polarizing plate, a liquid crystal panel, a dichroic prism, a projection lens, and the like. As such the laser light emitted by the laser light source can be guided to project onto the image display element 120 via the optical elements.

As shown in FIG. 1, in some embodiments, the image display system 100 further includes an audio generation module 140. The audio generation module 140 is configured to generate a vibration signal. The at least one actuator 130 is configured to vibrate using the vibration signal. In some embodiments, the audio generation module 140 is further configured to adjust a vibration frequency of the vibration signal between an audible frequency and an ultrasonic frequency.

Specifically, in some embodiments, as shown in FIG. 1, the audio generation module 140 includes a digital signal processor 141, an audio codec 142, and an amplifier 143. The audio codec 142 is configured to decode an audio signal received from an audio input source 300. The audio input source 300 may be a Bluetooth module, an audio jack, etc. That is, the audio signal transmitted from the audio input source 300 may be decoded by using the audio codec 142. The digital signal processor 141 is configured to generate a vibration signal having an audible frequency from the audio signal and transmit the vibration signal to the at least one actuator 130 via the amplifier 143. The digital signal processor 141 includes an ultrasonic frequency generator 141a therein. The ultrasonic frequency generator 141a is configured to generate an ultrasonic signal. The digital signal processor 141 is further configured to generate a vibration signal having an ultrasonic frequency from the ultrasonic signal and transmit the vibration signal to the at least one actuator 130 via the amplifier 143. In other words, depending on whether receiving the audio signal, the audio generation module 140 is able to adjust a vibration frequency of a vibration signal between the audible frequency and the ultrasonic frequency.

In some embodiments, the audible frequency of the vibration signal may be in a range from about 20 Hz to about 20 kHz, but the disclosure is not limited in this regard. In some embodiments, the ultrasonic frequency of the vibration signal may be in a range from about 20 kHz to several Gigahertzes, but the disclosure is not limited in this regard.

As shown in FIG. 1, in some embodiments, the image display system 100 further includes a display driver 160 and bridge ICs 170, 180. The display driver 160 is configured to drive the projector 110 to project the laser light using a video signal inputted to the display driver 160 by a host 200 via the bridge IC 170. The audio input source 300 inputs the audio signal to the audio codec 142 via the bridge IC 180. The host 200 may be a mobile phone, a computer, a 5G hub, or any other device capable of providing a video signal to the display driver 160. In some embodiments, the host 200 may include a transmission port therein which is communicatively coupled directly to the display driver 160, and the bridge IC 170 may be correspondingly omitted. In some embodiments, the host 200 may include a transmission port therein which is communicatively coupled directly to the audio codec 142, and the bridge IC 180 may be correspondingly omitted.

In some embodiments, the host 200 may be a component of the image display system 100. In some embodiments, as shown in FIG. 1, the audio input source 300 may be a component of the host 200.

In some embodiments, the image display system 100 further includes a controller which is implemented by a micro control unit 150 as shown in FIG. 1. The micro control unit 150 is electrically connected to the host 200, the display driver 160, and the digital signal processor 141 of the audio generation module 140. The micro control unit 150 is configured to drive the digital signal processor 141 of the audio generation module 140 to generate the vibration signal when the projector 110 projects the laser light. That is, the micro control unit 150 is able to detect the inputting of the video signal from the host 200 and simultaneously drive the digital signal processor 141 to generate the vibration signal.

In some embodiments, the micro control unit 150 is further configured to drive the digital signal processor 141 of the audio generation module 140 to generate the vibration signal having the audible frequency from the audio signal when the projector 110 projects the laser light. As mentioned above, the vibration signal having the audible frequency is generated from the audio signal generated by the audio codec 142. As such, audible sound can be produced at the image display element 120 by vibrating the image display element 120 using the vibration signal having the audible frequency, and the image displayed by the image display element 120 will not contain speckle owing to the vibration of the image display element 120 using the vibration signal having the audible frequency. Meanwhile, the surface of the image display element 120 is vibrated using the vibration signal having the audible frequency, so that the wavefront of light originally transmitted from the surface is constantly changing. Once the wavefront of light changes, the phase frequency also changes. When this happens, it is difficult for the laser light to form constructive/destructive interference patterns, and thus the speckle cannot be formed.

In some embodiments, the micro control unit 150 is further configured to drive the digital signal processor 141 of the audio generation module 140 to generate the vibration signal having the ultrasonic frequency when the projector 110 projects the laser light and no audio signal is received by the audio generation module 140. As mentioned above, the vibration signal having the ultrasonic frequency is generated from the ultrasonic signal by the digital signal processor 141. As such, no audible sound will be produced through the surface of the image display element 120, and the image displayed by the image display element 120 will also not contain speckle owing to the vibration of the image display element 120 using the vibration signal having the ultrasonic frequency. Meanwhile, the surface of the image display element 120 is vibrated using the vibration signal having the ultrasonic frequency, so that the wavefront of light originally transmitted from the surface is constantly changing. When this happens, it is also difficult for the laser light to form constructive/destructive interference patterns, and thus the speckle also cannot be formed.

In some embodiments, the micro control unit 150 is further configured to drive the digital signal processor 141 of the audio generation module 140 to generate the vibration signal having the audible frequency from the audio signal when the projector 110 does not project the laser light and the audio generation module 140 receives the audio signal.

In some embodiments, the micro control unit 150 is further configured to drive the digital signal processor 141 of the audio generation module 140 to generate the vibration signal having the audible frequency from an audio signal when the projector 110 projects the laser light and a decibel value included in the audio signal is not smaller than a threshold value. The micro control unit 150 is further configured to drive the digital signal processor 141 of the audio generation module 140 to generate the vibration signal having an ultrasonic frequency when the projector 110 projects the laser light and the decibel value included in the audio signal is smaller than the threshold value.

In some embodiments, the audio signal inputted by the audio input source 300 is a digital audio signal. The vibration signal generated by the digital signal processor 141 and transmitted to the amplifier 143 is an analog audio signal converted from the digital audio signal. The above-mentioned threshold value is predetermined in the digital signal processor 141, and the digital signal processor 141 is further configured to determine whether the decibel value included in the digital audio signal is not smaller than the threshold value.

In some embodiments, the audio signal inputted by the audio input source 300 is an analog audio signal. The audio codec 142 converts the analog audio signal into a digital audio signal (i.e., the audio codec 142 serves as an Analog-to-Digital converter). The vibration signal generated by the digital signal processor 141 and transmitted to the amplifier 143 is another analog audio signal converted from the digital audio signal. The above-mentioned threshold value is predetermined in the digital signal processor 141, and the digital signal processor 141 is further configured to determine whether the decibel value included in the digital audio signal is not smaller than the threshold value.

In some embodiments, the audio signal inputted by the audio input source 300 is an analog audio signal. In some embodiments, the analog audio signal is transmitted to the amplifier 143 without being converted, and whether the decibel value included in the analog audio signal is not smaller than the threshold value is determined on the amplifier 143. In some embodiments, the image display system 100 may further include a detector configured to determine whether the decibel value included in the analog audio signal is not smaller than the threshold value.

In some embodiments, the image display system 100 may further include a detector configured to detect a decibel value of the sound produced by the vibrated image display element 120. In some embodiments, the determination result is then returned to the digital signal processor 141. In some embodiments, the micro control unit 150 is further configured to drive the digital signal processor 141 of the audio generation module 140 to generate the vibration signal having the audible frequency from an audio signal when the projector 110 projects the laser light and the decibel value detected by the detector is not smaller than a threshold value. The micro control unit 150 is further configured to drive the digital signal processor 141 of the audio generation module 140 to generate the vibration signal having an ultrasonic frequency when the projector 110 projects the laser light and the decibel value detected by the detector is smaller than the threshold value.

In some embodiments, the digital signal processor 141 may be embedded in one of the audio codec 142, the amplifier 143, the micro control unit 150, and host 200, but the disclosure is not limited in this regard.

In some embodiments, the audio generation module 140, the micro control unit 150, the display driver 160, and the bridge ICs 170, 180 may be implemented on a circuit board, but the disclosure is not limited in this regard.

In some embodiments, the image display element 120 has a substantially uniform thickness to better ensure the quality of the audible sound when it is vibrated using the vibration signal having an audible frequency, but the disclosure is not limited in this regard. In some embodiments, a thickness of a portion of the image display element 120 may be adjusted to tune the tone of the audible sound produced when it is vibrated using the vibration signal having an audible frequency.

Figure 2:
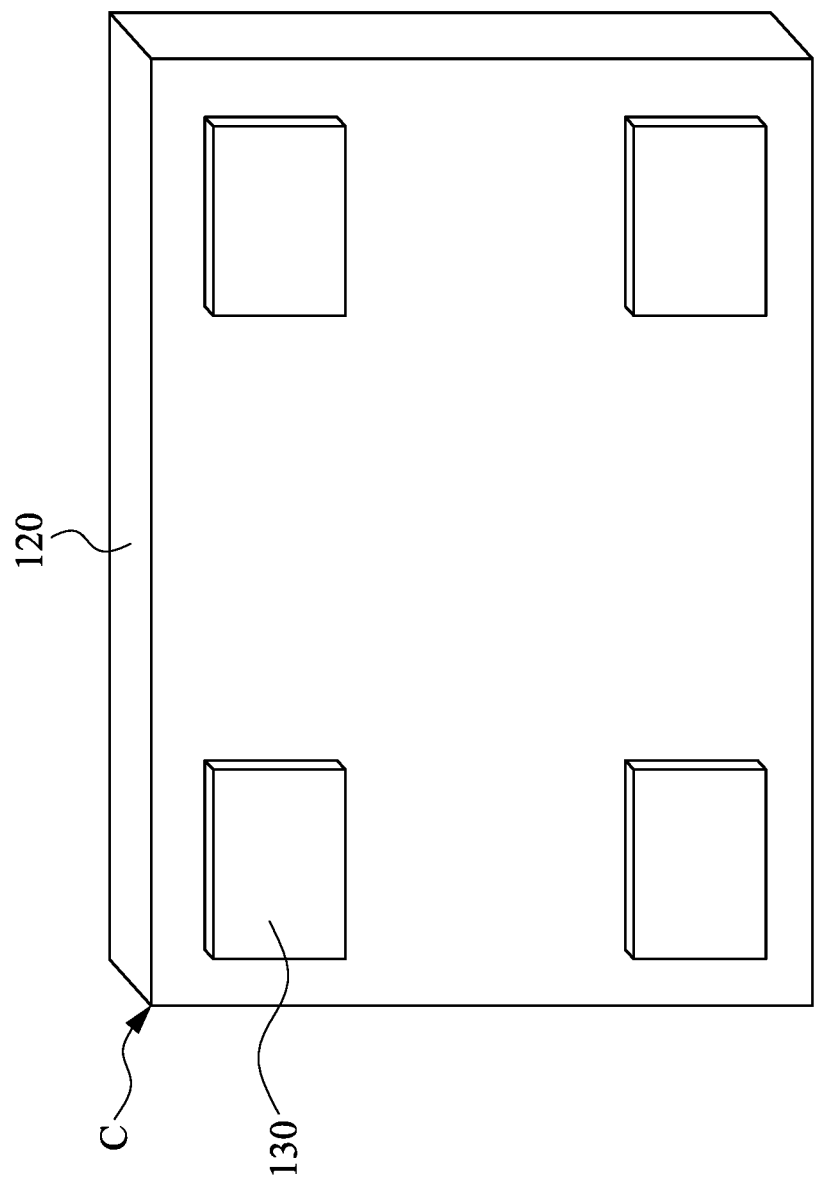
FIG. 2 is a perspective view of an image display element and a plurality of actuators of the image display system according to some embodiments of the present disclosure.

Reference is made to FIG. 2. FIG. 2 is a perspective view of an image display element 120 and a plurality of actuators 130 of the image display system 100 according to some embodiments of the present disclosure. As shown in FIG. 2, in some embodiments, the image display system 100 may include a plurality of actuators 130 separately disposed on the image display element 120. The image display element 120 has a plurality of corners C, and the actuators 130 are respectively adjacent to the corners C. The actuators 130 can individually, or together synchronously, vibrate the image display element 120. In some embodiments, when two or more of the actuators 130 synchronously vibrate the image display element 120 using a vibration signal having the same audible frequency, the amplitude of the audible sound produced by the image display element 120 being vibrated can be increased. This allows transmission distance of the audible sound produced to be longer. In some embodiments, when two or more of the actuators 130 synchronously vibrate the image display element 120 using vibration signals respectively having different audible frequencies, multi-channel auditory effects can be produced.

Figure 3:
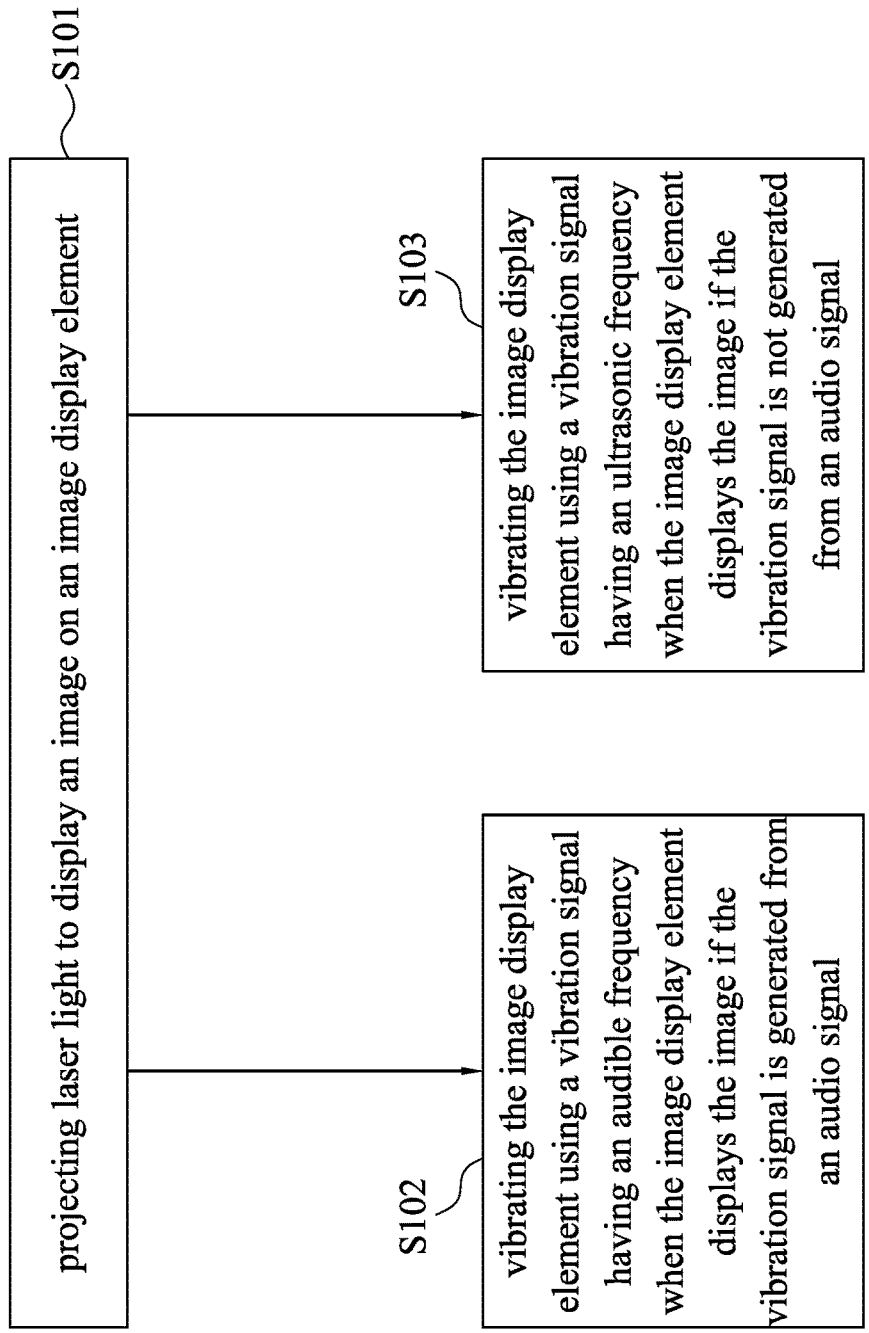
FIG. 3 is a flowchart of a multimedia playback method according to some embodiments of the present disclosure.

Reference is made to FIG. 3. FIG. 3 is a flowchart of a multimedia playback method 1000 according to some embodiments of the present disclosure. As shown in FIG. 3, the multimedia playback method 1000 begins with operation S101 in which laser light is projected to display an image on an image display element. The multimedia playback method 1000 continues with operation S102 in which the image display element is vibrated using a vibration signal having an audible frequency when the image display element displays the image if the vibration signal is generated from an audio signal. The multimedia playback method 1000 continues with operation S103 in which the image display element is vibrated using a vibration signal having an ultrasonic frequency when the image display element displays the image if the vibration signal is not generated from an audio signal.

In some embodiments, operation S102 of the multimedia playback method 1000 may be replaced by operations S104 and S105 individually following operation S101. In the operation S104, the image display element is vibrated using the vibration signal having an audible frequency when the image display element displays the image if the vibration signal is generated from an audio signal and a decibel value included in the audio signal is not smaller than a threshold value. In the operation S105, the image display element is vibrated using the vibration signal having an ultrasonic frequency when the image display element displays the image if the vibration signal is generated from an audio signal and a decibel value included in the audio signal is smaller than a threshold value.

In some embodiments, the multimedia playback method 1000 may further continue with operations S106 and S107. In the operation S106, projection of the laser light is stopped. In the operation S107, the image display element is vibrated using another vibration signal having the audible frequency after stopping projecting the laser light when said another vibration signal includes the sound information.

The discussion that follows illustrates embodiments of an image display system that can be operated according to the multimedia playback method 1000 of FIG. 3. While multimedia playback method 1000 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. In some cases, the operation S102 may be substantially performed at the same time as the operation S101. In some cases, the operation S103 may be substantially performed at the same time as the operation S101. In some cases, the operation S104 may be substantially performed at the same time as the operation S101. In some cases, the operation S105 may be substantially performed at the same time as the operation S101.

According to the foregoing recitations of the embodiments of the disclosure, it can be seen that the present disclosure provides an image display system and a multimedia playback method that can solve the problem of speckle caused by laser light and effectively produce sound at the same time. In the image display system, at least one actuator is attached to a surface of an image display element (e.g., a transmission-type screen or a reflection-type screen). The surface of the image display element is vibrated using a vibration signal, so that the wavefront of light originally transmitted from the surface is constantly changing. Once the wavefront of light changes, the phase frequency also changes. At this time, it is difficult for the laser light to form constructive/destructive interference patterns, and thus the speckle cannot be formed. In addition, when the vibration signal is generated from an audio signal, audible sound can also be produced through the surface of the image display element by vibrating the image display element using the vibration signal having an audible frequency. Furthermore, when the vibration signal does not generated from an audio signal, the image display element can be vibrated using the vibration signal having an ultrasonic frequency and still does not form speckle pattern in the projected image.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image display system, comprising:
   a projector configured to project laser light;
   an image display element configured to display an image using the projected laser light;
   at least one actuator configured to vibrate the image display element; and
   an audio generation module configured to generate a vibration signal, wherein the at least one actuator is configured to vibrate using the vibration signal.

2. The image display system of claim 1, wherein the image display element is made of a material comprising at least one of glass, plastic, and metal.

3. The image display system of claim 1, wherein the at least one actuator comprises a piezo actuator, a linear resonant actuator, or a vibration speaker.

4. The image display system of claim 1, wherein a number of the at least one actuator is plural, and the actuators are separately disposed on the image display element.

5. The image display system of claim 4, wherein the image display element has a plurality of corners, and the actuators are respectively adjacent to the corners.

6. The image display system of claim 1, wherein the image display element has a substantially uniform thickness.

7. The image display system of claim 1, wherein the audio generation module is further configured to adjust a vibration frequency of the vibration signal between an audible frequency and an ultrasonic frequency.

8. The image display system of claim 1, further comprising a controller configured to drive the audio generation module to generate the vibration signal when the projector projects the laser light.

9. The image display system of claim 1, further comprising a controller configured to drive the audio generation module to generate the vibration signal having an audible frequency from an audio signal when the projector projects the laser light.

10. The image display system of claim 1, further comprising a controller configured to drive the audio generation module to generate the vibration signal having an ultrasonic frequency when the projector projects the laser light and no audio signal is received by the audio generation module.

11. The image display system of claim 1, further comprising a controller configured to:
    drive the audio generation module to generate the vibration signal having an audible frequency from an audio signal when the projector projects the laser light and a decibel value comprised in the audio signal is not smaller than a threshold value; and
    drive the audio generation module to generate the vibration signal having an ultrasonic frequency when the projector projects the laser light and the decibel value comprised in the audio signal is smaller than the threshold value.

12. The image display system of claim 1, further comprising a controller configured to drive the audio generation module to generate the vibration signal having an audible frequency from an audio signal when the projector does not project the laser light and the audio generation module receives the audio signal.

13. A multimedia playback method, comprising:
    projecting laser light to display an image on an image display element; and
    vibrating the image display element using a vibration signal when the image display element displays the image;
    wherein vibrating the image display element comprises at least one of:
        vibrating the image display element using the vibration signal having an audible frequency if the vibration signal is generated from an audio signal; and
        vibrating the image display element using the vibration signal having an ultrasonic frequency if the vibration signal is not generated from an audio signal.

14. A multimedia playback method, comprising:
    projecting laser light to display an image on an image display element; and
    vibrating the image display element using a vibration signal when the image display element displays the image;
    wherein the vibration signal is generated from an audio signal, and vibrating the image display element comprises:
        vibrating the image display element using the vibration signal having an audible frequency if a decibel value comprised in the audio signal is not smaller than a threshold value; and
        vibrating the image display element using the vibration signal having an ultrasonic frequency if the decibel value comprised in the audio signal is smaller than the threshold value.

15. The method of claim 13, further comprising:
    stopping projecting the laser light; and
    vibrating the image display element using another vibration signal having an audible frequency after stopping projecting the laser light if said another vibration signal is generated from an audio signal.

16. The method of claim 14, further comprising:
    stopping projecting the laser light; and
    vibrating the image display element using another vibration signal having an audible frequency after stopping projecting the laser light if said another vibration signal is generated from an audio signal.

* * * * *